Nov. 11, 1924.  1,515,019
E. R. EVANS
MOTOR VEHICLE BRAKE
Original Filed Dec. 16, 1922
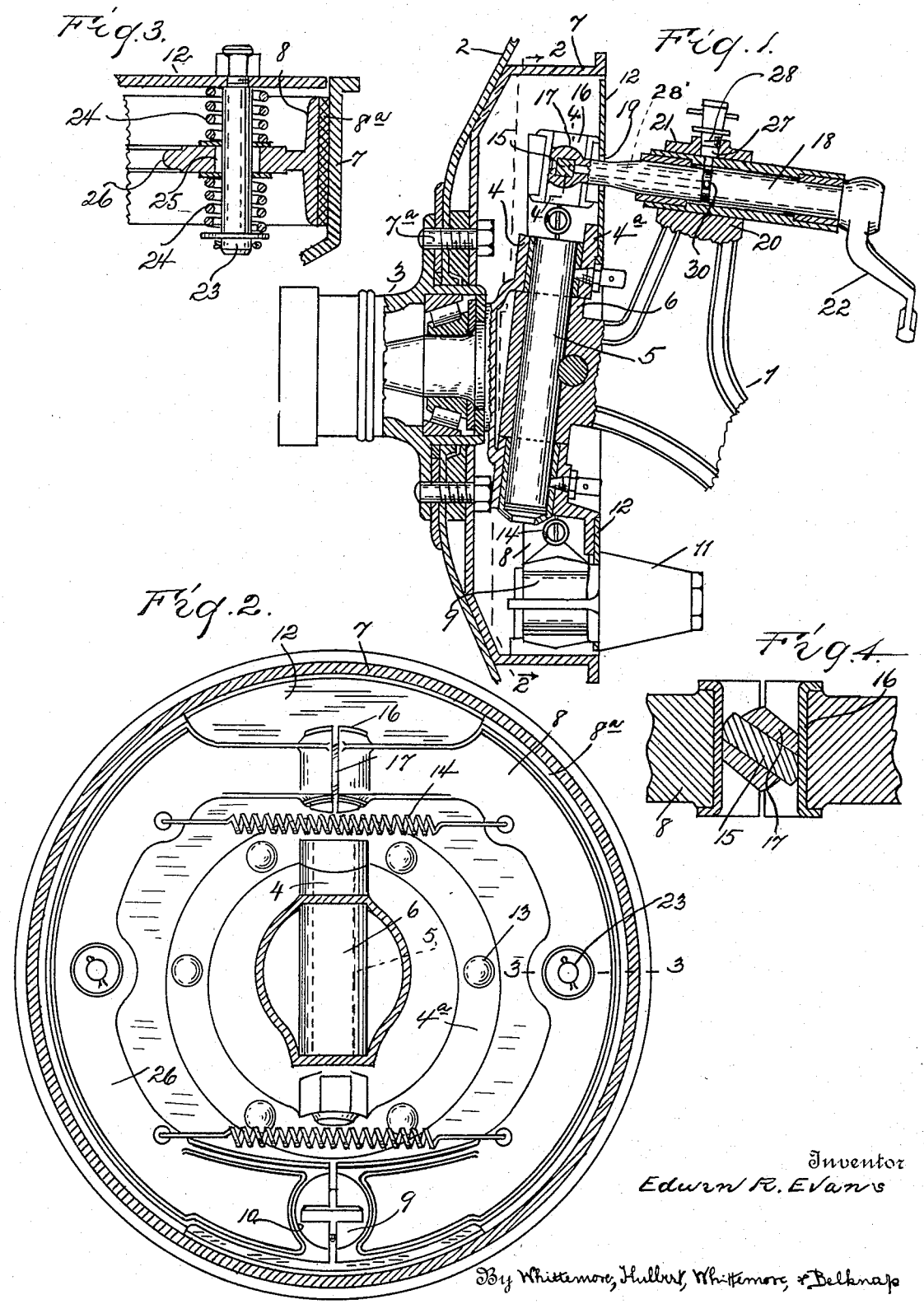
Inventor
Edwin R. Evans
By Whittemore, Hulbert, Whittemore & Belknap
Attorneys Patented Nov. 11, 1924.

1,515,019

UNITED STATES PATENT OFFICE.

EDWIN R. EVANS, OF DETROIT, MICHIGAN.

MOTOR VEHICLE BRAKE.

Original application filed December 16, 1922, Serial No. 607,341. Divided and this application filed June 25, 1923. Serial No. 647,734.

*To all whom it may concern:*

Be it known that I, EDWIN R. EVANS, a citizen of the United States of America, residing at Detroit, in the county of Wayne and State of Michigan, have invented certain new and useful Improvements in Motor Vehicle Brakes, of which the following is a specification, reference being had therein to the accompanying drawings.

This invention relates to motor vehicle brakes and this application is a division of the application resulting in Patent No. 1,463,159.

The invention consists primarily in an anti-rattle device for cushioning the brake shoes against transverse vibration and a further feature of the invention is a provision for lubricating a shaft and cam through which a braking force is applied to said shoes.

In the drawings:—

Figure 1 is a diametrical sectional view of a wheel equipped with the improved brake, the mounting of said wheel upon its axle being also disclosed;

Figure 2 is a sectional view on line 2—2 of Figure 1 disclosing the location of the brake shoes within the drum;

Figure 3 is a sectional view on line 3—3 of Figure 2 disclosing primarily the anti-rattle device;

Figure 4 is a cross section on line 4—4 of Figure 1 disclosing the engagement with the brake shoes of the cam whereby said shoes are spread against the drum.

In these views, the reference character 1 designates the front axle of a vehicle and 2 one of the wheels upon said axle. For steering purposes, it is the general practice to swivel the front wheels upon the axle. Thus the wheel 2 is journaled upon a spindle 3 having a pair of integral spaced bearings 4 respectively above and below the spindle axis for receiving the end portions of an approximately vertical pin 5 which establishes the desired swivel steering axis for the wheel by engagement with a bearing 6 integral with the axle between said bearings 4. 4ª is an annular plate integral with the bearings 4. 7 is a brake drum secured by bolts 7ª or the like to the interior face of the wheel 2 in the customary concentric relation to said wheel, and 8 designates a pair of complementary brake shoes arranged within said drum one at each side of the vertical axis thereof and provided with the customary linings 8ª for a frictional engagement with the drum, said shoes together forming an annulus of a substantially T-shaped cross section, as best seen in Figure 3. 9 is a cylindrical pivot member for the brake shoes engaging complementary semi-cylindrical seats 10 formed in the lower ends of said shoes, the pivotal axis being substantially parallel to that of the wheel. Said pivot member is provided with a support 11 mounted upon an annular sheet metal plate 12, the inner periphery of which is secured by rivets 13 to the annulus 4ª. Thus, the plate 12 and the support 11 for the brake shoe pivot are carried by the swivel plate 4ª which, in turn, carries the wheel supporting spindle 3, said plate 12 and the brake shoe pivot being thus maintained in constant relation with the brake drum in any position of steering adjustment of the wheel. 14 are the customary springs for holding the brake shoes normally out of restraining engagement with the brake drum.

The means for applying the brakes comprises a cam 15 located within a two-part cylindrical liner 16 journaled in the opposed upper extremities of the brake shoes. Said cam is elongated between the opposed end faces of the brake shoes in an oblique relation to said faces and is of square (or other polygonal) cross section with respect to its longitudinal axis, the cam extremities being spherically rounded. Said cam is freely longitudinally slidable in a head 17 occupying the two-part liner 16 and carried preferably integrally by a rock shaft 18 substantially transverse to the pin 5 and passing through a suitable opening 19 in the plate 12. 20 is a standard integral with the axle 1, the upper end of which standard forms a bearing 21 in which said rock shaft is journaled. The latter extends beyond the bearing 21 to carry an arm 22 for engagement by a brake control rod (not shown). The cam 15 is centered in alignment with the axis of the pin 5 about which the wheel has its steering movement and consequently maintains its operative relation to the brake shoes in any position of steering movement of the wheel.

As a provision against rattling of the brake shoes, it is preferred to loosely engage each shoe at a point substantially midway between its ends by a bolt 23 rigidly secured to the plate 12, a pair of coiled springs 24 being mounted upon each of said bolts, one at each side of the corresponding brake shoe, said springs being under a sufficient stress to resist lateral vibration of the brake shoes. The opening 25 in the rib member 26 of each brake shoe through which opening the bolt 23 passes is sufficiently larger than the bolt to allow for the necessary movement of the brake shoes transverse to the bolt in moving into and out of restraining engagement with the brake drum.

The bearing 21 has a radial opening 27 which may be normally closed by a plug 28 and through which, upon removal of said plug, lubricant may be supplied to the engaging faces of the shaft 18 and of said bearing. Provision is also made for delivering a portion of the lubricant introduced through the opening 27 to the engaging faces of the slidable cam 15 and of the head 17 mounting the cam. Thus, the shaft 18 is formed with an axial passage 28' communicating at one end with the central opening of the head 17 in which said cam slides and having its other end radially connected with the opening 27, as indicated at 30.

In the operation of the described invention, the brake shoes are normally held clear of the brake drum by the springs 14. To apply the brakes, the shaft 18 is rocked in a direction to reduce obliquity of the cam 15 to the engaged faces of the two-part liner 16, thereby forcing the shoes apart proportionately to the angular actuation of said shaft. The sliding mounting of the cam 15 in the head 17 is of advantage in that said cam is thus made self adjusting to effect equalization of the thrust transmitted through said cam to the respective brake shoes when the shaft 18 is rocked. Owing to the provision for lubrication as hereinbefore described, said cam will slide quite freely in the head 17. The described anti-rattle provision serves to absorb lateral vibrations of the brake shoes.

What I claim as my invention is:—

1. A brake mechanism comprising a brake drum, a brake shoe interiorly coacting with said drum, and yieldable anti-rattle means intermediately engaging said shoe.

2. A brake mechanism comprising a brake drum, a brake shoe interiorly coacting with said drum, and springs bearing upon opposite sides of said brake shoe to restrain the latter from rattle.

3. A brake mechanism comprising a brake drum, a brake shoe interiorly engaging said drum, and a spring laterally acting on said shoe to resist rattle.

4. A brake mechanism comprising a brake drum, a coacting brake shoe within said drum, a pivot mounting for said shoe, a pin passing laterally through said shoe, a common support for said pin and pivot mounting, and a spring upon said pin bearing against the shoe to take up rattle.

5. A brake mechanism comprising a brake drum, a plate forming a closure for the drum at one side thereof, a brake shoe interiorly engageable with said drum, a pin mounted upon said plate passing freely through an inwardly projecting portion of the shoe, and a spring upon said pin bearing against the shoe to absorb rattle.

6. A brake mechanism comprising a brake drum, a brake member frictionally engageable with said drum and anti-rattle means yieldably resisting lateral movement of said member in either direction.

7. A brake mechanism comprising a brake drum, a plate forming a closure for said drum at one side thereof, a brake shoe interiorly engageable with said drum, a pin mounted upon said plate passing freely through an inwardly projecting portion of the shoe and means carried by said pin resisting lateral play of said shoe.

8. A brake mechanism comprising a brake drum, a brake shoe interiorly coacting with said drum, springs bearing upon opposite sides of said shoe to prevent rattle and a mounting for said springs passing through said shoe and restrained at one side of the shoe from longitudinal shifting.

In testimony whereof I affix my signature.

EDWIN R. EVANS.